US008462852B2

(12) United States Patent
Xu et al.

(10) Patent No.: US 8,462,852 B2
(45) Date of Patent: Jun. 11, 2013

(54) METHODS AND APPARATUS FOR ADAPTIVELY CHOOSING A SEARCH RANGE FOR MOTION ESTIMATION

(75) Inventors: Lidong Xu, Beijing (CN); Yi-Jen Chiu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 836 days.

(21) Appl. No.: 12/582,061

(22) Filed: Oct. 20, 2009

(65) Prior Publication Data

US 2011/0090964 A1   Apr. 21, 2011

(51) Int. Cl.
*H04N 7/50* (2006.01)
(52) U.S. Cl.
USPC .................................................. 375/240.16
(58) Field of Classification Search
USPC .................................................. 375/240.16
See application file for complete search history.

(56) References Cited

U.S. PATENT DOCUMENTS

| | | | |
|---|---|---|---|
| 6,014,473 | A | 1/2000 | Hossack et al. |
| 7,023,921 | B2 | 4/2006 | Subramaniyan et al. |
| 7,260,148 | B2 | 8/2007 | Sohm |
| 7,463,687 | B2 | 12/2008 | Subramaniyan et al. |
| 7,590,180 | B2 | 9/2009 | Kang |
| 7,751,482 | B1 | 7/2010 | Srinivasan et al. |
| 7,880,547 | B2 | 2/2011 | Lee et al. |
| 7,924,135 | B2 | 4/2011 | Chen et al. |
| 7,940,152 | B1 | 5/2011 | Kim et al. |
| 8,107,748 | B2 | 1/2012 | Miao et al. |
| 8,295,551 | B2 * | 10/2012 | Lertrattanapanich et al. ............ 382/107 |
| 2003/0031128 | A1 | 2/2003 | Kim et al. |
| 2003/0063671 | A1 | 4/2003 | Song |
| 2003/0189981 | A1 | 10/2003 | Lee |
| 2004/0114688 | A1 | 6/2004 | Kang |
| 2005/0135481 | A1 | 6/2005 | Sung et al. |

(Continued)

FOREIGN PATENT DOCUMENTS

| | | |
|---|---|---|
| CN | 1450809 A | 10/2003 |
| CN | 1977539 A | 6/2007 |

(Continued)

OTHER PUBLICATIONS

Office Action received for Korean Patent Application No. 2010-0064539, mailed on Feb. 10, 2012, 2 pages of English Translation Only.

(Continued)

*Primary Examiner* — Sath V Perungavoor
*Assistant Examiner* — James Pontius
(74) *Attorney, Agent, or Firm* — Garrett IP, LLC

(57) ABSTRACT

Systems, methods, and computer program products that can be used to determine a search range (SR) when performing motion estimation at, for example, a video encoder or decoder. Determining a motion vector for a current block during motion estimation may involve searching within a search window that may reside in a reference frame, or in a previously decoded block that spatially or temporally neighbors the current block. Such a search seeks a motion vector that minimizes a metric, such as a sum of absolute differences between corresponding blocks of reference frames. A motion vector that minimizes such a metric may be a good candidate for use in motion estimation. The search may become more efficient if a search range is determined such that the extent of the search is bounded. A search range may be determined at the block level or at the picture level.

26 Claims, 10 Drawing Sheets

U.S. PATENT DOCUMENTS

| | | |
|---|---|---|
| 2005/0220190 A1 | 10/2005 | Ha et al. |
| 2005/0259736 A1 | 11/2005 | Payson |
| 2005/0286777 A1 | 12/2005 | Kumar et al. |
| 2007/0064803 A1 | 3/2007 | Miao et al. |
| 2007/0064804 A1 | 3/2007 | Paniconi et al. |
| 2007/0268964 A1 | 11/2007 | Zhao |
| 2007/0297510 A1 | 12/2007 | Herpel et al. |
| 2008/0069230 A1 | 3/2008 | Kondo et al. |
| 2008/0181309 A1 | 7/2008 | Lee et al. |
| 2008/0253149 A1 | 10/2008 | Matumoto |
| 2008/0253457 A1 | 10/2008 | Moore |
| 2009/0060359 A1 | 3/2009 | Kim et al. |
| 2009/0067505 A1 | 3/2009 | Tourapis et al. |
| 2009/0161763 A1* | 6/2009 | Rossignol et al. ....... 375/240.16 |
| 2009/0207915 A1 | 8/2009 | Yan et al. |
| 2009/0304084 A1 | 12/2009 | Hallapuro et al. |
| 2010/0046614 A1 | 2/2010 | Choi et al. |
| 2011/0002387 A1 | 1/2011 | Chiu et al. |
| 2011/0002389 A1 | 1/2011 | Xu et al. |
| 2011/0002390 A1 | 1/2011 | Chiu et al. |
| 2011/0043316 A1 | 2/2011 | Yang et al. |
| 2011/0261882 A1 | 10/2011 | Zheng et al. |
| 2011/0286523 A1 | 11/2011 | Dencher |

FOREIGN PATENT DOCUMENTS

| | | |
|---|---|---|
| CN | 101945276 A | 1/2011 |
| CN | 102045563 A | 5/2011 |
| CN | 10-2340664 A | 2/2012 |
| DE | 10 2010 025 816 A1 | 1/2011 |
| DE | 10 2010 046 508 A1 | 6/2011 |
| DE | 10 2011 008 630 A1 | 9/2011 |
| EP | 1903798 A2 | 3/2008 |
| EP | 1932366 A2 | 6/2008 |
| EP | 1981281 A2 | 10/2008 |
| GB | 2471577 A | 1/2011 |
| GB | 2477033 B | 4/2012 |
| KR | 10-2009-0069461 A | 7/2009 |
| TW | 2012-04054 A | 1/2012 |
| WO | 2006/000504 A1 | 1/2006 |
| WO | WO2007035276 A2 | 3/2007 |
| WO | 2010/086041 A1 | 8/2010 |
| WO | 20122045225 A1 | 4/2012 |
| WO | 2013048908 A1 | 4/2013 |

OTHER PUBLICATIONS

Office Action Received for Korean Patent Application No. 2010-0102216, mailed on May 22, 2012, 3 pages of English Translation Only.

Combined Search and Examination Report received for United Kingdom Patent Application No. 1100658.2, mailed on May 16, 2011, 6 pages.

Kamp et al., "Decoder Side Motion Vector Derivation for Inter Frame Video Coding," 15th IEEE International Conference on Image Processing, (ICIP 2008), Oct. 12-15, 2008, pp. 1120-1123.

Klomp et al., "Decoder-Side Block Motion Estimation for H.264/MPEG-4 AVC Based Video Coding," IEEE International Symposium on Circuits and Systems, (ISCAS 2009), May 24-27, 2009, pp. 1641-1644.

Laroche et al., "RD optimized coding for motion vector predictor selection," IEEE Transactions on circuits and systems for video technology, vol. 18(12), Dec. 2008, pp. 1681-1691.

Combined Search and Examination Report received for United Kingdom Patent Application No. 1015985.3, mailed on Jan. 17, 2011, 5 pages.

Combined Search and Examination Report received for United Kingdom Patent Application No. 1011216.7, mailed on Oct. 14, 2010, 6 pages.

Kamp et al., "Fast Decoder Side Motion Vector Derivation for Inter Frame Video Coding," Proc. of International Picture Coding Symposium {PCS} '09, Digital Object Identifier 10.1109/PCS.2009.5167453, Print ISBN 978-1-4244-4593-6, IEEE, Piscataway, Chicago, IL, USA, May 6-8, 2009, 4 pages.

Office Action Received for Chinese Patent application No. 201010270056.0, mailed on May 3, 2012, 5 pages of Office Action and 5 pages of English Translation.

Office Action Received for Chinese Patent application No. 201010507057.2, mailed on Aug. 3, 2012, 3 pages of Office Action and 3 pages of English Translation.

Office Action Received for Korean Patent Application No. 10-2010-4254, mailed on Jun. 12, 2012, 3 pages of Office Action and 3 pages of English Translation.

Office Action Received for Japanese Patent Application No. 2011-004871, mailed on Aug. 14, 2012, 2 page of Office Action and 2 page of English Translation.

Chen et al., "A Macroblock Level Adaptive Search Range Algorithm for Variable Block Size Motion Estimation in H.264/AVC," International Symposium on Intelligent Signal Processing and Communication Systems, ISPACS, Xiamen, China, Nov. 28-Dec. 1, 2007, pp. 598-601.

Hsia et al., "High Efficiency and Low Complexity Motion Estimation Algorithm for MPEG-4 AVC/H.264 Coding," Tamkang Journal of Science and Engineering, 2007, vol. 10, No. 3, pp. 221-234.

Nisar et al., "Fast Motion Estimation Algorithm Based on Spatio-Temporal Correlation and Direction of motion Vectors," Electronics Letters, Dept. of Mechatronics, Gwangju Inst. of Sci. & Technol., Nov. 23, 2006, vol. 42, No. 24, pp. 2.

Werda et al., "Optimal DSP-Based Motion Estimation Tools Implementation For H.264/AVC Baseline Encoder," IJCSNS International Journal of Computer Science and Network Security, May 2007, vol. 7, No. 5, pp. 141-150.

Office Action received for German Patent Application No. 102010046508.9, mailed on Jul. 26, 2011, 14 pages of German Office Action including 7 pages of English Translation.

Chen, et al., "A Macroblock Level Adaptive Search Range Algorithm For Variable Block Size Motion Estimation in H.264/AVC", International Symposium on Intelligent Signal Processing and Communication Systems, ISPACS, Xiamen, China, Nov. 28-Dec. 1, 2007, pp. 598-601.

Hsia, et al., "High Efficiency and Low Complexity Motion Estimation Algorithm for MPEG-4 AVC/H.264 Coding", Tamkang Journal of Science and Engineering, 2007, vol. 10, No. 3, pp. 221-234.

Nisar, et al., "Fast Motion Estimation Algorithm based on Spatio-Temporal Correlation and Direction of Motion Vectors", Electronics Letters, Dept. of Mechatronics, Gwangju Inst. of Sci. & Technol., Nov. 23, 2006, vol. 42, No. 24, 2 Pages.

Werda, et al., "Optimal DSP-Based Motion Estimation Tools Implementation for H.264/AVC Baseline Encoder", IJCSNS International Journal of Computer Science and Network Security, May 2007, vol. 7, No. 5, pp. 141-150.

Office Action Received for Germany Patent application No. 10 2010 046 508.9, mailed on Sep. 5, 2012, 8 pages of Office Action and 5 pages of English Translation.

International Search Report and Written Opinion received for PCT Patent Application No. PCT/CN2011/000568, mailed on Jan. 19, 2012, 9 pages.

Korean Office Action Received for Korean Patent Application 10-2011-0004254, mailed on Dec. 26, 2012. 5 pages of Office Action Including 2 pages of English Translation.

Japanese Office Action Received for Japanese Patent Application No. 2011-004871 mailed on Nov. 20, 2012, 4 pages of Office action including 2 pages of English Translation.

International Search Report and Written Opinion received for Patent Application No. PCT/CN2010/002107, mailed on Oct. 13, 2011, 12 pages.

Guo et al. "Distributed Video Coding with Spatial Correlation Exploited Only at the Decoder." IEEE. School of Computer Science and Technology, Harbin Institute of Technology, Harbin, 150001, China, Microsoft Research Asia, Beijing, 100080, China. 2007 pp. 4, pp. 41-44.

* cited by examiner

METHODS AND APPARATUS FOR ADAPTIVELY CHOOSING A SEARCH RANGE FOR MOTION ESTIMATION

CROSS REFERENCE TO RELATED APPLICATIONS

This application is related to U.S. Provisional No. 61/222,982, filed on Jul. 3, 2009, U.S. Provisional No. 61/222,984, filed on Jul. 3, 2009, U.S. application Ser. No. 12/566,823, filed on Sep. 25, 2009, and U.S. application Ser. No. 12/567,540, filed on Sep. 25, 2009.

BACKGROUND

Motion estimation (ME) in video coding may be used to improve video compression performance by removing or reducing temporal redundancy among video frames. For encoding an input block, traditional motion estimation may be performed at an encoder within a specified search window in reference frames. This may allow determination of a motion vector that minimizes the sum of absolute differences (SAD) between the input block and a reference block in a reference frame. The motion vector (MV) information can then be transmitted to a decoder for motion compensation. The motion vector can be determined for fractional pixel units, and interpolation filters can be used to calculate fractional pixel values.

Where original input frames are not available at the decoder, ME at the decoder can be performed using the reconstructed reference frames. When encoding a predicted frame (P frame), there may be multiple reference frames in a forward reference buffer. When encoding a bi-predictive frame (B frame), there may be multiple reference frames in the forward reference buffer and at least one reference frame in a backward reference buffer. For B frame encoding, mirror ME or projective ME may be performed to get the MV. For P frame encoding, projective ME may be performed to get the MV.

In other contexts, block-based motion vector may be produced at the video decoder by performing motion estimation on available previously decoded pixels with respect to blocks in one or more frames. The available pixels could be, for example, spatially neighboring blocks in the sequential scan coding order of the current frame, blocks in a previously decoded frame, or blocks in a downsampled frame in a lower layer when layered coding has been used. The available pixels can alternatively be a combination of the above-mentioned blocks.

BRIEF DESCRIPTION OF THE DRAWINGS/FIGURES

DETAILED DESCRIPTION

The following describes systems, methods, and computer program products that can be used to determine a search range vector (SR) when performing motion estimation at, for example, a video encoder or decoder. Determining a motion vector for a current block during motion estimation may involve searching within a search window that may reside in a reference frame, or in a previously decoded block that spatially or temporally neighbors the current block. Such a search seeks a motion vector that minimizes a metric, such as a SAD, between corresponding blocks of reference frames. A motion vector that minimizes such a metric may be a good candidate for use in motion estimation. The search may become more efficient if a search range is determined such that the extent of the search is bounded.

A search may be performed at the block level or at the picture level. When determining a search range vector at the block level, the search range vector may be different for different blocks in the overall frame. When determining a search range vector at the picture level, the same search range vector may be used for each block in the frame.

In an embodiment, a search range vector may consist of a search range component in each of the horizontal and vertical directions.

Note that the terms "frame" and "picture" are used interchangeably herein, as would be understood by a person of ordinary skill in the art.

Mirror ME

Figure 1:
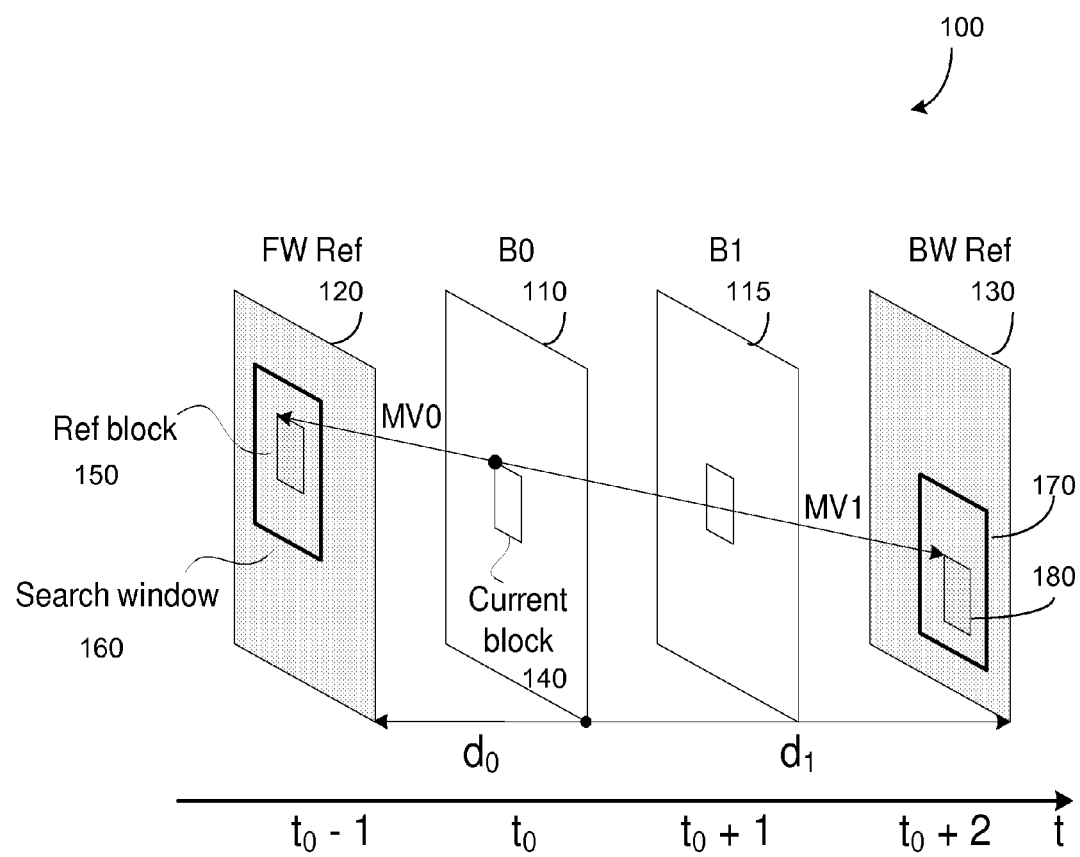
FIG. 1 illustrates mirror motion estimation at a decoder, according to an embodiment.

Mirror ME may use both forward and backward reference frames and, as a result, is generally applicable to B frame encoding. FIG. 1 shows how mirror ME may be performed according to an embodiment 100. In the embodiment of FIG. 1, there may be two B frames, 110 and 115, between a forward reference frame 120 and a backward reference frame 130. Frame 110 may be the current encoding frame. When encoding the current block 140, mirror ME can be performed to get motion vectors by performing searches in search windows 160 and 170 of reference frames 120 and 130, respectively. As mentioned above, where the current input block may not be available at the decoder, mirror ME may be performed with the two reference frames.

An exemplary motion search in this context may proceed as follows. A search window may be specified in the forward reference frame. This search window may be the same at both the encoder and decoder. A search path may be specified in the forward search window. Full search or any fast search schemes can be used here, so long as the encoder and decoder follow the same search path. For a vector MV0 in the search path, its mirror motion vector MV1 may be obtained in the backward search window. Here it may be assumed that the motion trajectory is a straight line during the associated time period, which may be relatively short. MV1 can be obtained as the following function of MV0, where d0 and d1 may be the distances between the current frame and each of the respective reference frames.

$$MV1 = \frac{d_1}{d_0}MV0$$

A metric such as a SAD may be calculated between (i) the reference block pointed to by MV0 in the forward reference frame and (ii) the reference block pointed to by MV1 in the backward reference frame. These reference blocks are shown as 150 and 180, respectively, in FIG. 1. A determination may be made as to whether any additional motion vectors MV0 exist in the search path. If so, more than one MV0 may be obtained, where each MV0 has an associated MV1. Moreover, for each such associated pair, a metric, e.g., a SAD, may be obtained. The MV0 that generates the optimal value for the metric, e.g., the minimal SAD, is chosen.

Given the pair of motion vectors MV0 and MV1 that is obtained, for the current block, its forward predictions P0(MV0) can be obtained with MV0, its backward predictions P1(MV1) can be obtained with MV1, and its bi-directional predictions can be obtained with both MV0 and MV1. The bi-directional predictions can be, for example, the average of P0(MV0) and P1(MV1), or the weighted average (P0(MV0)*d1+P1(MV1)*d0)/(d0+d1). An alternative function may be used to obtain a bi-directional prediction. In an embodiment, the encoder and decoder may use the same prediction method.

Mirror ME assumes that motions between each two adjacent pictures are linear, as shown in FIG. 1. When encoding a current block in picture 110, the two reference pictures, FWRef 120 and BWRef 130, may be available in a reference buffer. Let the available block MV between BWRef 130 and FWRef 120 be Ref_MVi for block i (here the motion vector is scaled according to picture distance), then the search range vector may be determined using all Ref_MVi, using a linear or non-linear processing function f( ), SR=SR_Pic=*f*(Ref_MV*i*).

The processing function f( ) may be as follows in an embodiment. First, the mean value of absolute Ref_MVi, over blocks i may be obtained. The mean may be denoted by mv_ref. Then for picture 110, the adaptive search range can be calculated as follows. α and β may be two predetermined constants (a scalar and a vector respectively). These can be set to 1.1 and (4, 4) respectively in an embodiment. Here, the calculated adaptive SR is shown as SR_Pic. This may be used as the picture level adaptive search range vector.

SR=SR_Pic=α*mv_ref+β

For each block in frame 110, the block level search range can be determined based on the motion vectors of temporal and/or spatial neighboring blocks. For example, assume the motion vectors of neighboring blocks i are Nbr_MVi respectively (here the motion vector is scaled according to picture distance). Then the search range vector can be determined using all Nbr_MVi, using a linear or non-linear processing function g( ), SR=SR_Blk=*g*(Nbr_MV*i*).

In an embodiment, the processing function g( ) may be as follows. First, the mean value of absolute Nbr_MVi, may be obtained, denoted by mv_nbr. Then the block level adaptive search range vector SR_Blk can be calculated as follows.

Where α and β are two constants that can be set to 1.1 and (4, 4) respectively in an embodiment, SR=SR_Blk=α*mv_nbr+β

In some embodiments, the horizontal and vertical components in a search range vector may need to be identical. Here, the value of the larger of the two components may be used for both the horizontal and vertical components.

Projective Motion Estimation

Projective ME may be performed to derive an MV for encoding the current block.

Figure 2:
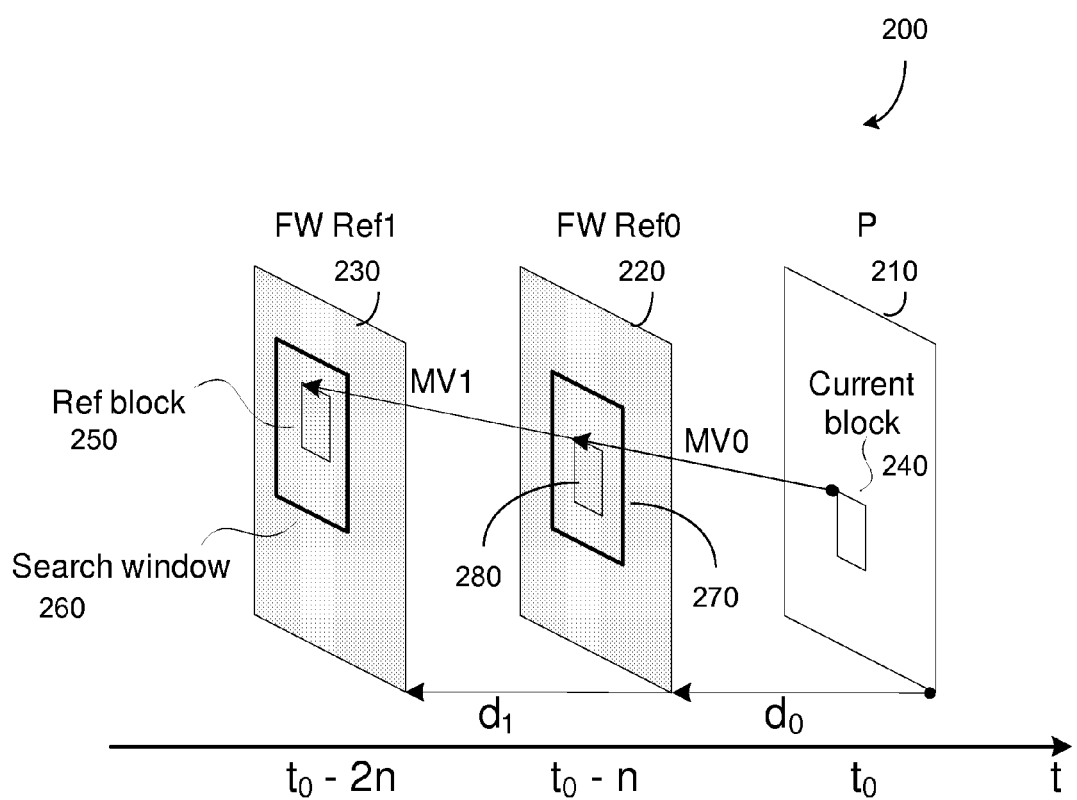
FIG. 2 illustrates projective motion estimation at a decoder, according to an embodiment.

FIG. 2 shows an exemplary projective ME scenario that may use two forward reference frames, FWRef0 (shown as reference frame 220) and FWRef1 (shown as reference frame 230). These reference frames may be used to derive a motion vector for a target block 240 in a current frame 210. A search window 270 may be specified in reference frame 220, and a search path may be specified in search window 270. For each motion vector MV0 in the search path, its projective motion vector MV1 may be determined in search window 260 of reference frame 230. For each pair of motion vectors, MV0 and its associated motion vector MV1, a metric such as a SAD may be calculated between (1) the reference block 280 pointed to by the MV0 in reference frame 220, and (2) the reference block 250 pointed to by the MV1 in reference frame 230. The motion vector MV0 that yields the optimal value for the metric, e.g., the minimal SAD, may then be chosen as the motion vector for target block 240.

The process for projective ME may proceed as follows. A search window may be specified in a first forward reference frame. This window may be the same at both the encoder and decoder. A search path may be specified in this search window. Full search or fast search schemes may be used here, for example, so that the encoder and decoder may follow the same search path. For a motion vector MV0 in the search path, its projective motion vector MV1 may be obtained in a second search window in a second forward reference frame. Here it may be assumed that the motion trajectory is a straight line over this short time period. MV1 may be obtained as the following function of MV0, where d0 and d1 may be the distances between the current frame and each of the respective reference frames.

$$MV1 = \frac{d_1}{d_0}MV0$$

A metric such as a SAD may be calculated between (i) the reference block pointed to by MV0 in the first reference frame, and (ii) the reference block pointed to by MV1 in the second reference frame. A determination may be made as to whether there are any additional motion vectors MV0 that remain in the search path and that have not yet been considered. If at least one MV0 remains, its corresponding projective motion vector MV1 may be determined. In this manner, a set of pairs, MV0 and MV1, may be determined and a metric, e.g., a SAD, calculated for each pair. One of the MV0s may be chosen, where the chosen MV0 yields the optimal value for the metric, e.g., the minimal SAD. This MV0 may then be used to predict motion for the current block.

The predictions for the current block may be obtained in different ways. The predictions can be P0(MV0)), P1(MV1), (P0(MV0)+P1(MV1))/2, or (P0(MV0)*d1+P1(MV1)*d0)/(d0+d1), for example. In other embodiments, other functions may be used. The predictions may be obtained in the same way at both the encoder and decoder.

Projective ME may assume that motion between two adjacent pictures is linear, as shown in FIG. 2. Using the same method described above for minor ME, the picture level search range may be obtained using the block motion vectors between FWRef0 (frame 220 of FIG. 2) and FWRef1 (frame 430). The block level search range can be obtained using the motion vector information of blocks that neighbor the current block temporally and spatially, as described above with respect to mirror ME.

Motion Estimation Based on Spatially Neighboring Blocks

Figure 3:
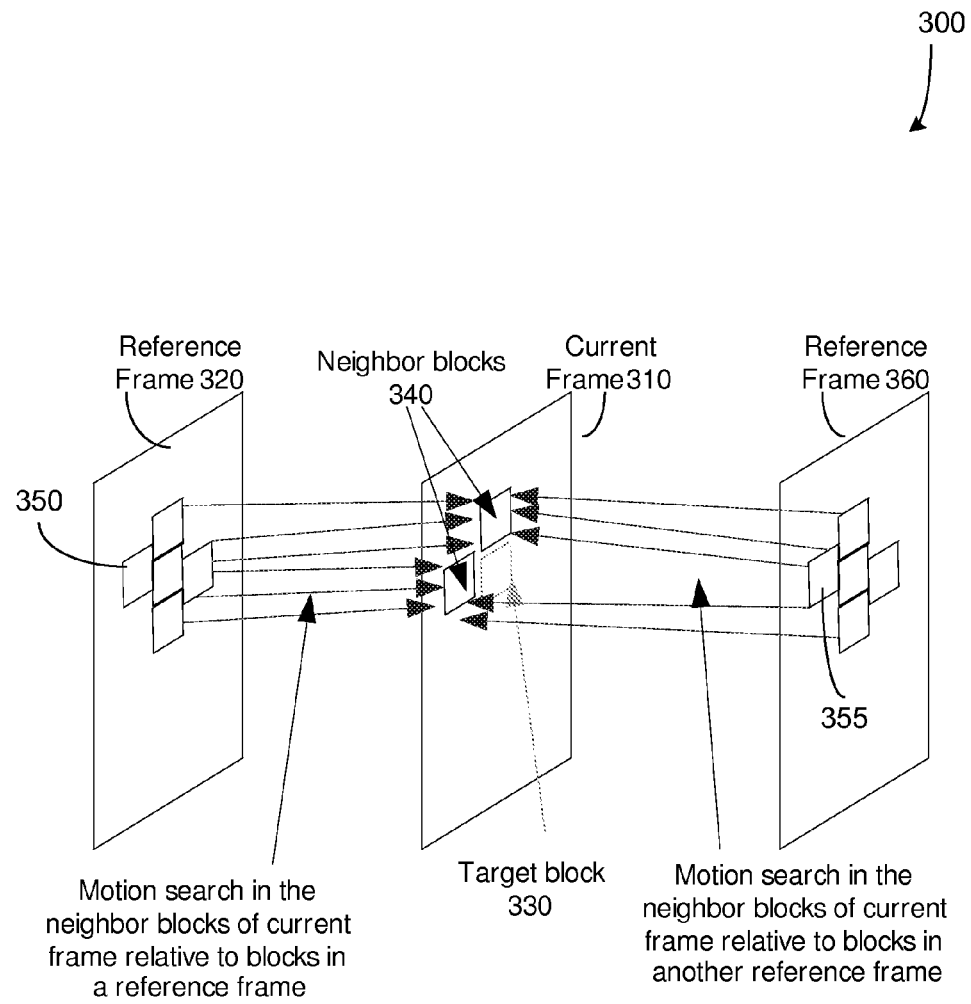
FIG. 3 illustrates MV derivation using already decoded blocks from a current frame, where the motion search is based on blocks in two different reference frames, according to an embodiment.

FIG. 3 shows an embodiment 300 that may utilize one or more neighboring blocks 340 (shown here as blocks above and to the left of the target block 330) in a current frame 310. This may allow generation of a motion vector based on one or more corresponding blocks 350 and 355 in a previous reference frame 320 and a subsequent reference frame 360, respectively, where the terms "previous" and "subsequent" refer to temporal order. The motion vector can then be applied to target block 330. In an embodiment, a raster scan coding order may be used to determine spatial neighbor blocks above, to the left, above and to the left, and above and to the right of the target block. This approach may be used for B frames, which use both preceding and following frames for decoding.

The approach exemplified by FIG. 3 may be applied to available pixels of spatially neighboring blocks in a current frame, as long as the neighboring blocks were decoded prior to the target block in sequential scan coding order. Moreover, this approach may apply motion search with respect to reference frames in reference frame lists for a current frame.

The processing of the embodiment of FIG. 3 may take place as follows. First, one or more blocks of pixels may be identified in the current frame, where the identified blocks neighbor the target block of the current frame. Motion search for the identified blocks may then be performed, based on corresponding blocks in a temporally subsequent reference frame and on corresponding blocks in a previous reference frame. The motion search may result in motion vectors for the identified blocks. Alternatively, the motion vectors of the neighboring blocks may be determined prior to identification of those blocks. The motion vectors may then be used to derive the motion vector for the target block, which may then be used for motion compensation for the target block. This derivation may be performed using any suitable process known to persons of ordinary skill in the art. Such a process may be, for example and without limitation, weighted averaging or median filtering.

If the current picture has both backward and forward reference pictures in the reference buffer, the same method as used for mirror ME may be used to get the picture level and block level adaptive search range vectors. Otherwise, if only forward reference pictures are available, the method described above for projective ME may be used to get the picture level and block level adaptive search range.

Motion Estimation Based on Temporally Neighboring Blocks

Figure 4:
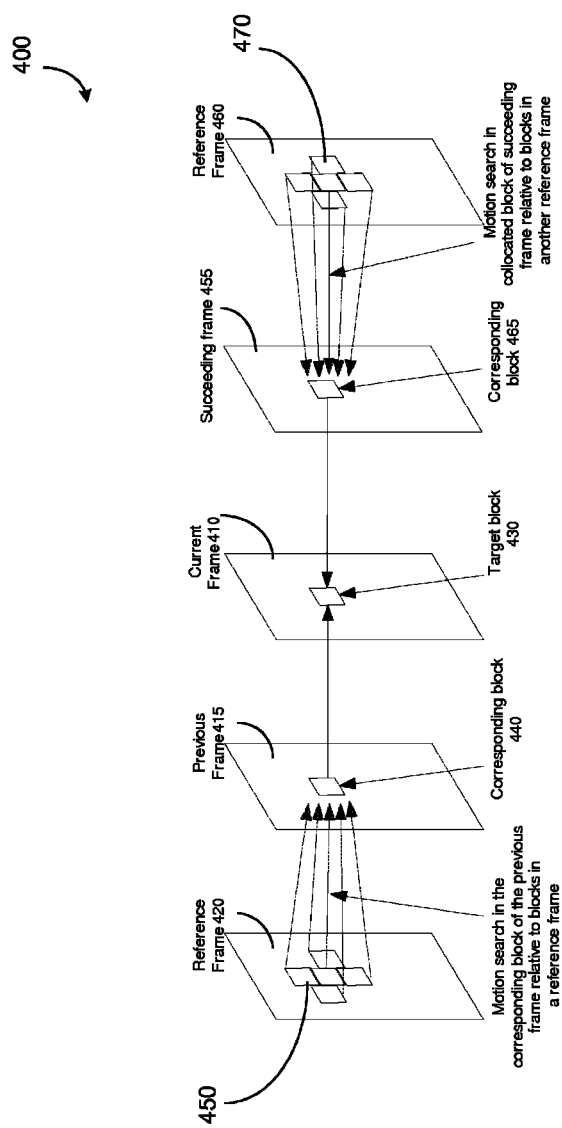
FIG. 4 illustrates MV derivation using previously decoded blocks from already decoded previous and succeeding frames, according to an embodiment.

In an alternative embodiment, the corresponding blocks of previous and succeeding reconstructed frames, in temporal order, may be used to derive a motion vector. This approach is illustrated in FIG. 4 as embodiment 400. To encode a target block 430 in a current frame 410, already decoded pixels may be used, where these pixels may be found in a corresponding block 440 of a previous frame 415, and in a corresponding block 465 of a succeeding frame 455. A first motion vector may be derived for corresponding block 440, by doing a motion search through one or more blocks 450 of reference frame 420. Block(s) 450 may neighbor a block in reference frame 420 that corresponds to block 440 of previous frame 415. A second motion vector may be derived for corresponding block 465 of succeeding frame 455, by doing a motion search through one or more blocks 470 of reference frame 460. Block(s) 470 may neighbor a block in reference frame 460 that corresponds to block 465 of succeeding frame 455. Based on the first and second motion vectors, forward and/or backward motion vectors for target block 430 may be determined. These latter motion vectors may then be used for motion compensation for the target block The ME processing for such a situation is as follows. A block may first be identified in a previous frame, where this identified block may correspond to the target block of the current frame. A first motion vector may be determined for this identified block of the previous frame, where the first motion vector may be defined relative to a corresponding block of a first reference frame. A block may be identified in a succeeding frame, where this block may correspond to the target block of the current frame. A second motion vector may be determined for this identified block of the succeeding frame, where the second motion vector may be defined relative to the corresponding block of a second reference frame. One or two motion vectors may be determined for the target block using the respective first and second motion vectors above.

When encoding/decoding the current picture, the block motion vectors between the previous frame 415 and the reference frame 420 are available. Using these motion vectors, the picture level adaptive search range can be determined in the manner described above for projective ME. The motion vectors of the corresponding block and blocks that spatially neighbor the corresponding block can be used to derive the block level adaptive search range as in the case of mirror ME.

Motion Estimation Based on Blocks in a Lower Downsampled Layer

Figure 5:
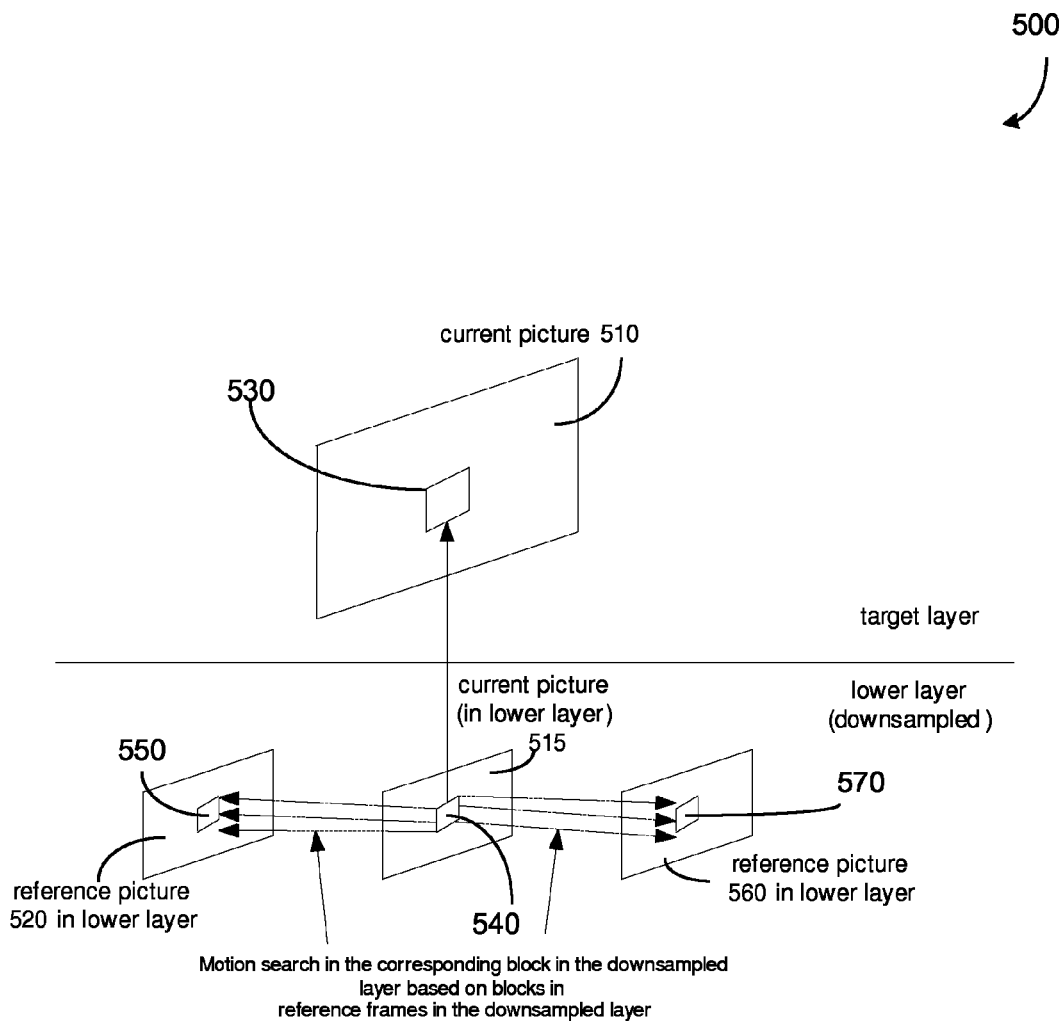
FIG. 5 illustrates MV derivation using a previously decoded block from a lower level in a layered coding context, according to an embodiment.

In an embodiment, pixels that can be used to determine an MV for a target block may come from corresponding blocks in a lower layer whose video is downsampled from an original input in a scalable video coding scenario. FIG. 5 shows an example 500 utilizing a lower layer block 540 corresponding to the target block 530 of the current picture 510. The block 540 may occur in a picture 515 that corresponds to current picture 510. The corresponding block 540 can be used to perform the motion search, given one or more blocks 550 and 570 in respective reference pictures 520 and 560 in the lower layer. The reference pictures in the lower layer can be the forward or backward (previous or succeeding) pictures in temporal order. Since the motion vector may be derived in the downsampled layer, the motion vector may be upscaled before it is applied to the target block 530 in the target layer.

This approach may also be applied to already-decoded blocks that are spatial neighbors to the block 540 in the lower layer corresponding to the target frame 530 in the current picture 510.

The processing for this embodiment is as follows. Given a target block in a current frame, a corresponding block may be identified in a corresponding frame in a lower layer. A motion vector may be determined for the corresponding block in the lower layer, relative to one or more reference frames in the lower layer. The determined motion vector may then be used for motion estimation for the target block in the current frame. In an alternative embodiment, the motion vector is determined at the lower layer, prior to identifying the block in the lower layer for ME purposes for the target layer.

When decoding the current picture in target layer, the lower layer picture has already been decoded, and the block motion vectors between the lower layer current picture and lower layer reference pictures are available. Those block motion vectors can be used to determine the picture level adaptive search range as described above with respect to mirror ME. Also, the motion vectors of the lower layer collocated block and the blocks spatially neighboring the lower layer collocated block can be used to determine the block level adaptive search range as described above for mirror ME.

Processing for Adaptive Determination of SR

Figure 6:
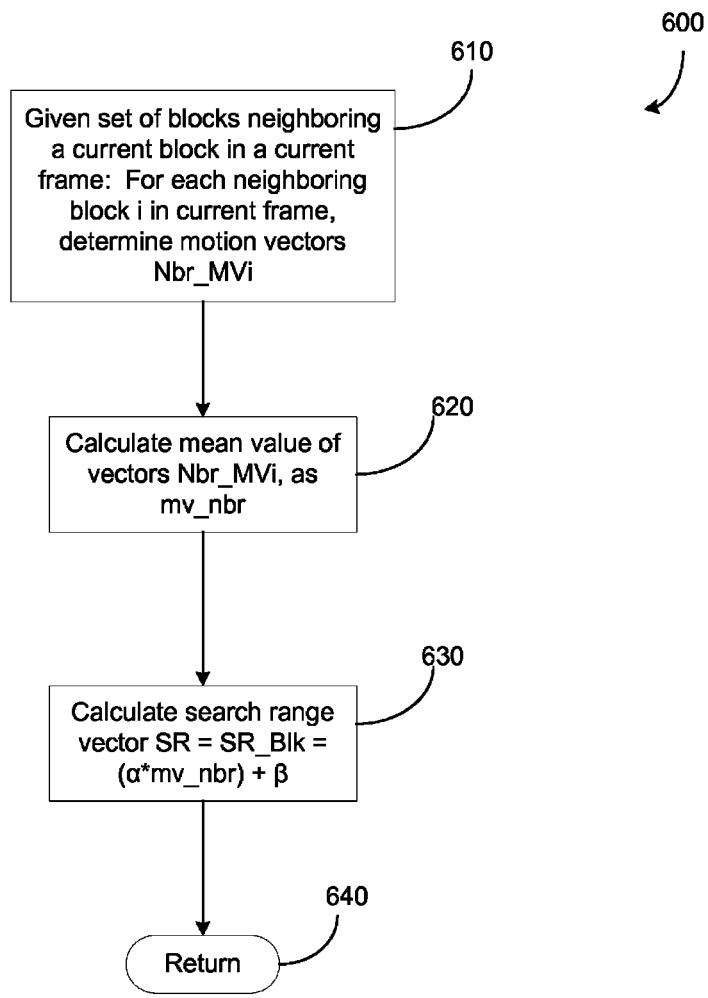
FIG. 6 is a flowchart illustrating determination of a search range vector at the block level, according to an embodiment.

A process 600 for adaptively determining a search range vector at the block level is shown in FIG. 6, according to an embodiment. At 610, a set of blocks may be considered, where the blocks may neighbor the current block in a current frame. For each neighboring block i in the current frame, the respective motion vector may be obtained, Nbr_MVi. Here, neighboring blocks may be spatial neighbors. Spatial neighbors may or may not be immediately adjacent to the current block. Alternatively, neighboring blocks may be temporal neighbors, as discussed above.

At 620, the mean of vectors Nbr_MVi may be calculated. This results in a vector mv_nbr. At 630, the search range vector is determined at the block level, $$SR\_Blk=(\alpha*mv\_nbr)+\beta$$

Here, $\alpha$ and $\beta$ are predetermined constants that may be experimentally determined, where $\alpha$ may be a scalar value and $\beta$ may be a two-dimensional vector. In an embodiment, $\alpha=1.1$ and $\beta=(4, 4)$. The process 600 concludes at 640.

Figure 7:
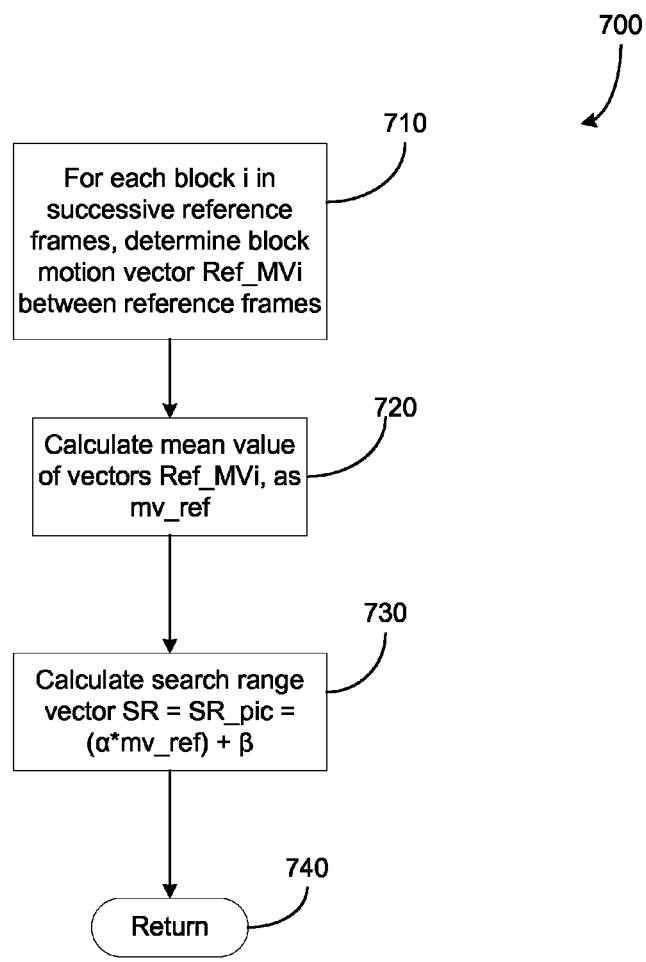
FIG. 7 is a flowchart illustrating determination of a search range vector at the picture level, according to an embodiment.

A process 700 for adaptively determining a search range vector at the picture level is shown in FIG. 7, according to an embodiment. At 710, for each block i in a succeeding or preceding frame, the respective motion vector may be obtained, Ref_MVi. Such a frame may be a reference frame, for example. At 720, the mean of vectors Ref_MVi may be calculated. This results in a vector mv_ref. At 730, the search range vector is determined at the picture level, $$SR\_Pic=(\alpha*mv\_ref)+\beta$$

As before, $\alpha$ and $\beta$ are predetermined constants that may be experimentally determined, where $\alpha$ may be a scalar value and $\beta$ may be a two-dimensional vector. In an embodiment, $\alpha=1.1$ and $\beta=(4, 4)$. The process 700 concludes at 740.

Implementation

The processing described above may be implemented in hardware, firmware, or software, or a combination thereof. In addition, any one or more features disclosed herein may be implemented in hardware, software, firmware, or combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, may refer to a computer program product including a computer readable medium having computer program logic stored therein to cause a computer system to perform one or more features and/or combinations of features disclosed herein.

Figure 8:
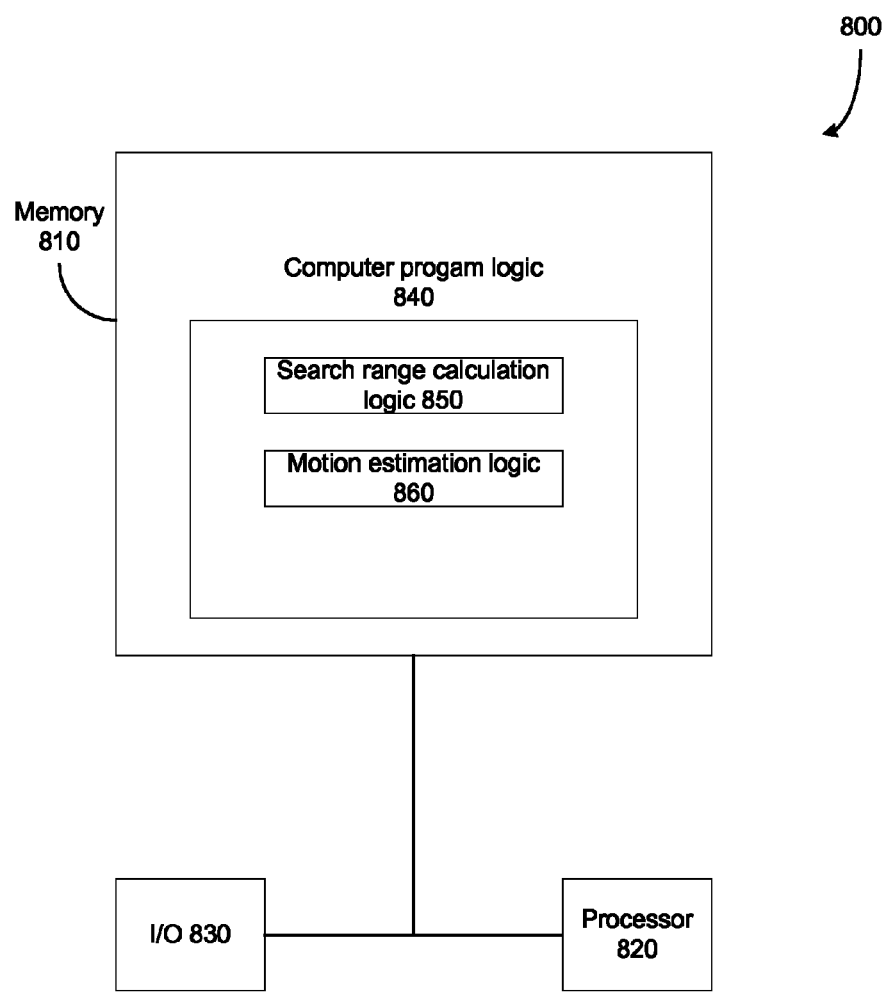
FIG. 8 illustrates a computing context of an exemplary software embodiment.

A software or firmware embodiment of the processing described above is illustrated in FIG. 8. System 800 may include a processor 820 and a body of memory 810 that may include one or more computer readable media that may store computer program logic 840. Memory 810 may be implemented as a hard disk and drive, a removable media such as a compact disk and drive, or a read-only memory (ROM) device, for example. Processor 820 and memory 810 may be in communication using any of several technologies known to one of ordinary skill in the art, such as a bus. Logic contained in memory 810 may be read and executed by processor 820.

One or more I/O ports and/or I/O devices, shown collectively as I/O 830, may also be connected to processor 820 and memory 810.

Computer program logic 840 may include motion estimation logic 860. When executed, motion estimation logic 860 may perform the motion estimation processing described above. Motion estimation logic 860 may include, for example, projective motion estimation logic that, when executed, may perform operations described above. Logic 860 may also or alternatively include, for example, mirror motion estimation logic, logic for performing ME based on temporal or spatial neighbors of a current block, or logic for performing ME based on a lower layer block that corresponds to the current block.

Prior to motion estimation logic 860 performing its processing, a search range vector may be generated. This may be performed as described above by search range calculation logic 850. This module may therefore perform the operations shown in FIGS. 6 and 7. Once the search range vector is generated, this vector may be used to bound the search that is performed by motion estimation logic 860.

Figure 9:
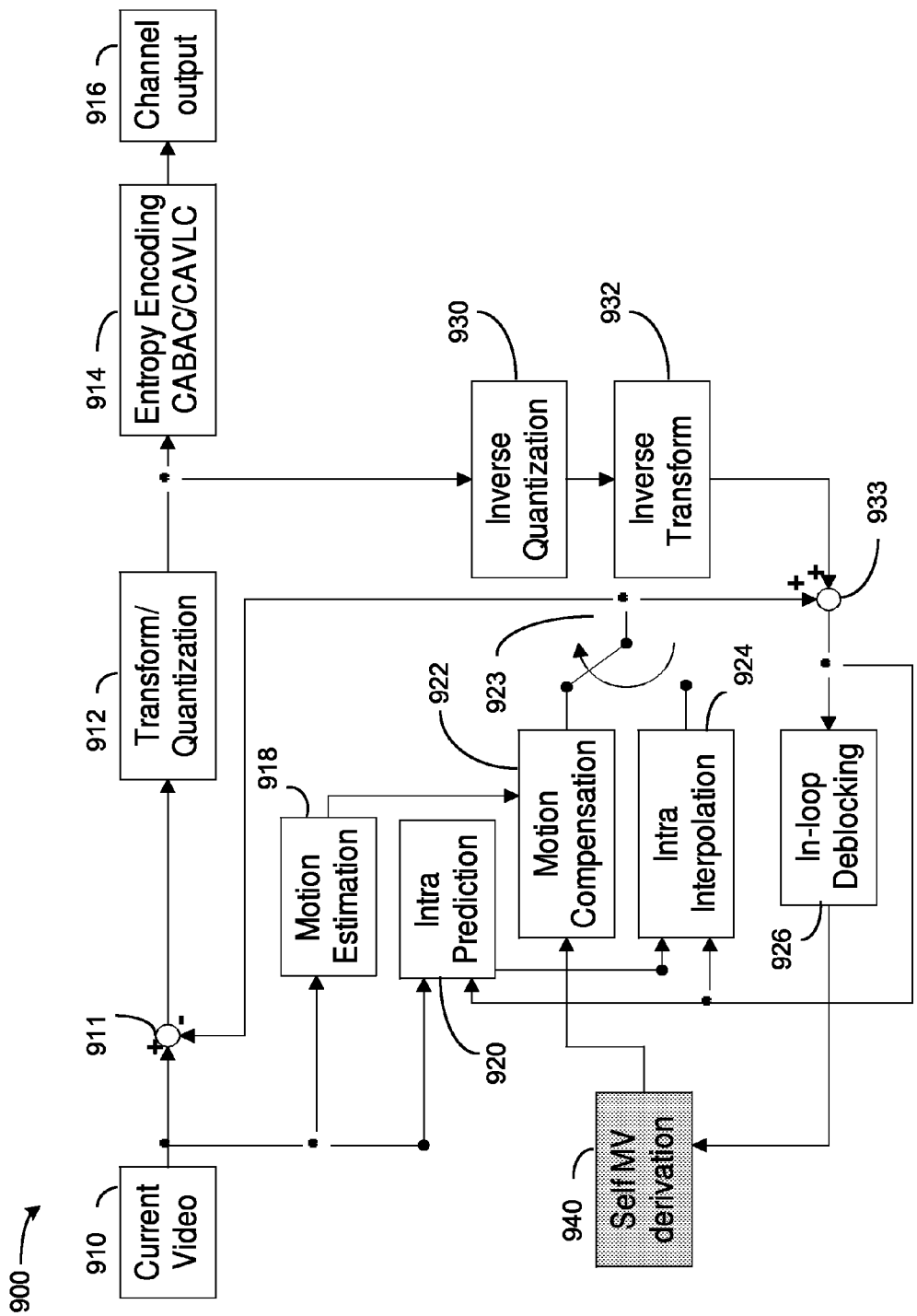
FIG. 9 is a block diagram showing a self MV derivation module in the context of a H.264 encoder, according to an embodiment.

Logic to perform search range vector determination may be incorporated in a self MV derivation module that is used in a larger codec architecture. FIG. 9 illustrates an exemplary H.264 video encoder architecture 900 that may include a self MV derivation module 940, where H.264 is a video codec standard. Current video information may be provided from a current video block 910 in a form of a plurality of frames. The current video may be passed to a differencing unit 911. The differencing unit 911 may be part of the Differential Pulse Code Modulation (DPCM) (also called the core video encoding) loop, which may include a motion compensation stage 922 and a motion estimation stage 918. The loop may also include an intra prediction stage 920, and intra interpolation stage 924. In some cases, an in-loop deblocking filter 926 may also be used in the loop.

The current video 910 may be provided to the differencing unit 911 and to the motion estimation stage 918. The motion compensation stage 922 or the intra interpolation stage 924 may produce an output through a switch 923 that may then be subtracted from the current video 910 to produce a residual. The residual may then be transformed and quantized at transform/quantization stage 912 and subjected to entropy encoding in block 914. A channel output results at block 916.

The output of motion compensation stage 922 or inter-interpolation stage 924 may be provided to a summer 933 that may also receive an input from inverse quantization unit 930 and inverse transform unit 932. These latter two units may undo the transformation and quantization of the transform/quantization stage 912. The inverse transform unit 932 may provide dequantized and detransformed information back to the loop.

A self MV derivation module 940 may implement the processing described herein for derivation of a motion vector. Self MV derivation module 940 may receive the output of in-loop deblocking filter 926, and may provide an output to motion compensation stage 922.

Figure 10:
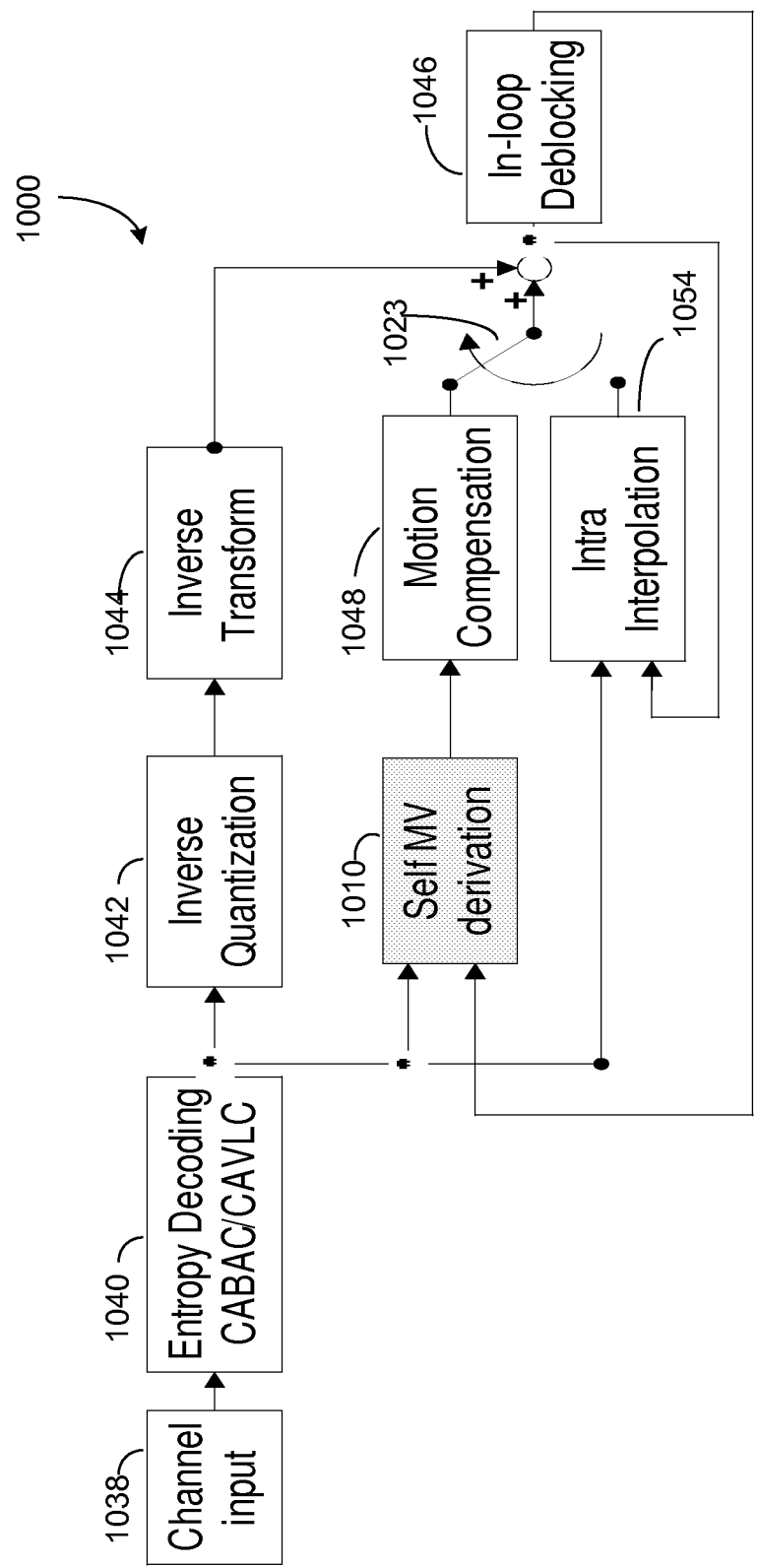
FIG. 10 is a block diagram showing a self MV derivation module in the context of a H.264 decoder, according to an embodiment.

FIG. 10 illustrates an H.264 video decoder 1000 with a self MV derivation module 1010. Here, a decoder 1000 for the encoder 900 of FIG. 9 may include a channel input 1038 coupled to an entropy decoding unit 1040. The output from the decoding unit 1040 may be provided to an inverse quantization unit 1042 and an inverse transform unit 1044, and to self MV derivation module 1010. The self MV derivation module 1010 may be coupled to a motion compensation unit 1048. The output of the entropy decoding unit 1040 may also be provided to intra interpolation unit 1054, which may feed a selector switch 1023. The information from the inverse transform unit 1044, and either the motion compensation unit 1048 or the intra interpolation unit 1054 as selected by the switch 1023, may then be summed and provided to an in-loop de-blocking unit 1046 and fed back to intra interpolation unit 1054. The output of the in-loop deblocking unit 1046 may then be fed to the self MV derivation module 1010.

The self MV derivation module may be located at the video encoder, and synchronize with the video decoder side. The self MV derivation module could alternatively be applied on a generic video codec architecture, and is not limited to the H.264 coding architecture.

CONCLUSION

Methods and systems are disclosed herein with the aid of functional building blocks, such as those listed above, describing the functions, features, and relationships thereof. At least some of the boundaries of these functional building blocks have been arbitrarily defined herein for the convenience of the description. Alternate boundaries may be defined so long as the specified functions and relationships thereof are appropriately performed. In addition, the encoder and decoder described above may be incorporated in respective systems that encode a video signal and decode the resulting encoded signal respectively using the processes noted above.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A method, comprising:
   determining a set of motion vectors related to blocks associated with a current block;
   calculating a mean value (mv) of the related motion vectors; and
   calculating a search range vector SR, according to a formula $$SR=(\alpha*mv)+\beta$$

where $\alpha$ is a predetermined constant scalar and $\beta$ is a predetermined constant vector, SR bounds a motion search in performance of motion estimation for the current block, $\alpha=1.1$, $\beta=(4, 4)$, and said determination, my calculation, and SR calculation are performed by a processor.

2. The method of claim 1, wherein the related motion vectors are associated with respective blocks of a reference frame, and wherein the search range vector SR is used for performing motion estimation for the current block of a current frame, and for all other blocks in the current frame.

3. The method of claim 2, wherein each of the related motion vectors extends from a respective block of a backward reference frame to a corresponding block of a forward reference frame.

4. The method of claim 2, wherein each of the related motion vectors extends from a respective block of a first forward reference frame to a corresponding block of a second forward reference frame.

5. The method of claim 2, wherein each of the related motion vectors extends from one of a respective block in a backward reference frame to a previous frame relative to the current frame, or a respective block in a forward reference frame to a succeeding frame relative to the current frame.

6. The method of claim 1, wherein the related motion vectors are associated with blocks that neighbor the current block, and wherein the search range vector SR is used in performance of motion estimation for the current block.

7. The method of claim 6, wherein the neighboring blocks neighbor the current block spatially in the current frame.

8. The method of claim 6, wherein the neighboring blocks occur in temporally neighboring frames relative to the current frame and correspond to the current block.

9. A system, comprising:
   a processor; and
   a memory in communication with said processor, for storing a plurality of processing instructions for directing said processor to
      determine a set of motion vectors related to blocks associated with a current block;
      calculate a mean value (mv) of the related motion vectors; and
      calculate a search range vector SR, according to a formula $$SR=(\alpha*mv)+\beta$$

where $\alpha$ is a predetermined constant scalar, $\beta$ is a predetermined constant vector, $\alpha=1.1$, $\beta=(4, 4)$, and SR is used to bound a motion search in performance of motion estimation for the current block.

10. The system of claim 9, wherein the processor and memory are incorporated in a video encoder.

11. The system of claim 9, wherein the processor and memory are incorporated in a video decoder.

12. The system of claim 9, wherein the related motion vectors are associated with respective blocks of a reference frame, and wherein the search range vector SR is used for performing motion estimation for the current block of a current frame, and for all other blocks in the current frame.

13. The system of claim 12, wherein each of the related motion vectors extends from a respective block of a backward reference frame to a corresponding block of a forward reference frame.

14. The system of claim 12, wherein each of the related motion vectors extends from a respective block of a first forward reference frame to a corresponding block of a second forward reference frame.

15. The system of claim 12, wherein each of the related motion vectors extends from one of:
   a respective block in a backward reference frame to a previous frame relative to the current frame, or
   a respective block in a forward reference frame to a succeeding frame relative to the current frame.

16. The system of claim 9, wherein the related motion vectors are associated with blocks that neighbor the current block, and wherein the search range vector SR is used in performance of motion estimation for the current block.

17. The system of claim 16, wherein the neighboring blocks neighbor the current block spatially in the current frame.

18. The system of claim 16, wherein the neighboring blocks occur in temporally neighboring frames relative to the current frame and correspond to the current block.

19. A computer program product including a non-transitory computer readable medium having computer program logic stored therein, the computer program logic comprising:
   logic to cause a processor to determine a set of motion vectors related to blocks associated with a current block;

logic to further cause the processor to calculate a mean value (mv) of the related motion vectors; and logic to further cause the processor to calculate a search range vector SR, according to a formula $$SR=(\alpha*mv)+\beta$$

where $\alpha$ is a predetermined constant scalar, $\beta$ is a predetermined constant vector, $\alpha=1.1$, $\beta=(4, 4)$, and SR bounds a motion search in performance of motion estimation for the current block.

20. The computer program product of claim 19, wherein the related motion vectors are associated with respective blocks of a reference frame, and wherein the search range vector SR is used for performing motion estimation for the current block of a current frame, and for all other blocks in the current frame.

21. The computer program product of claim 20, wherein each of the related motion vectors extends from a respective block of a backward reference frame to a corresponding block of a forward reference frame.

22. The computer program product of claim 20, wherein each of the related motion vectors extends from a respective block of a first forward reference frame to a corresponding block of a second forward reference frame.

23. The computer program product of claim 20, wherein each of the related motion vectors extends from one of:

a respective block in a backward reference frame to a previous frame relative to the current frame, or a respective block in a forward reference frame to a succeeding frame relative to the current frame.

24. The computer program product of claim 19, wherein the related motion vectors are associated with blocks that neighbor the current block, and wherein the search range vector SR is used in performance of motion estimation for the current block.

25. The computer program product of claim 24, wherein the neighboring blocks neighbor the current block spatially in the current frame.

26. The computer program product of claim 24, wherein the neighboring blocks occur in temporally neighboring frames relative to the current frame and correspond to the current block.

* * * * *